3,060,169
CONDENSATION PRODUCTS OF GLUCOSIDES WITH CARBONYL COMPOUNDS
Arthur Stoll, Arlesheim, and Jany Renz and Albert von Wartburg, Basel, Switzerland, assignors, by mesne assignments, to Saul & Co., Newark, N.J., as nominee of Fidelity Union Trust Company
No Drawing. Filed May 11, 1956, Ser. No. 584,167
Claims priority, application Switzerland May 13, 1955
6 Claims. (Cl. 260—210)

The present invention is concerned with condensation products of glucosides with carbonyl compounds, which condensation products correspond to the formula

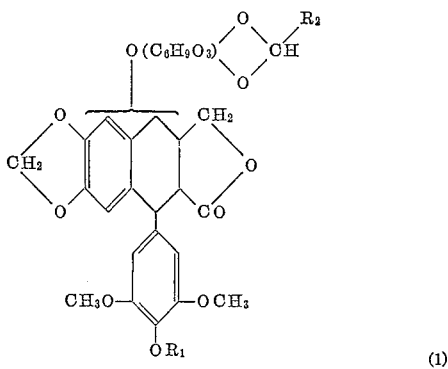

wherein $R_1$ represents H or an alkyl group with 1 to 6 carbon atoms, and $R_2$ stands for an alkyl, aryl or heterocyclic residue, and with the preparation of such condensation products.

The aforesaid condensation products (I) can be prepared by reacting compounds which correspond to the formula

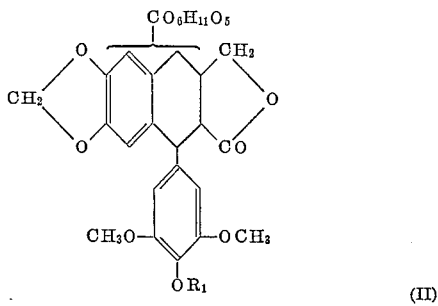

wherein $R_1$ has the afore-recited significance, with carbonyl compounds of the formula $$R_2\text{—CHO}$$

wherein $R_2$ has the previously indicated significance, and then isolating the resultant condensation products.

It is known that the compounds podophyllotoxin, 4'-demethyl-podophyllotoxin, α-peltatin and β-peltatin, obtainable from the water-insoluble resin fractions of podophyllum rhizomes, having an anti-mitotic action [Kelly and Hartwell, J. Nat. Cancer Inst., vol. 14, 967 (1954)]. However, the therapeutic use of these sugar-free compounds is complicated by their high toxicity. Glucosides of the said compounds obtained from the podophyllum rhizomes have been prepared, and these glucosides are characterized, relative to the sugar-free compounds, by enhanced anti-mitotic action, better solubility in water, and lower toxicity. However, the therapeutic use of these glucosides is restricted by the fact that, e.g. upon peroral administration, they are relatively easily split by the digestive ferments into glucose and the difficultly soluble and toxic aglucones. Copending application Ser. No. 573,083, filed March 22, 1956, now abandoned, is concerned with overcoming these difficulties by protecting the glucosidic bond between aglucone and sugar against fermentative splitting by acylating the free hydroxyl groups of the sugar residue and in appropriate cases of the aglucone in the 4'-position.

According to the present invention, the said fermentative splitting into aglucone and sugar is prevented by the substitution of only a part of the free hydroxyl groups of the sugar residue, without impairing any of the valuable pharmacodynamic properties of the starting materials, such more particularly as their anti-mitotic action. This is achieved by the introduction of an alkylidene or an aralkylidene group or a heterocyclic residue, such for example as a furfurylidene or a thenylidene group, into the glucose residue of the said glucosides, by condensing the latter with an aldehyde ($R_2$—CHO, supra).

The condensation products (Formula I, supra) are conveniently prepared by reacting the glucosides (Formula II) with the aldehydes ($R_2$—CHO), while excluding moisture (water vapor), in the presence of a water-binding agent, such as molten zinc chloride or anhydrous copper sulfate or the like or by the addition of a small quantity of a strong acid, such for example as concentrated sulfuric acid, hydrochloric acid or p-toluenesulfonic acid, in the presence or absence or an inert anhydrous solvent, such for example as dioxane, dimethylformamide or the like. The removal of the water liberated by the reaction can also be effected by distillation, i.e. without the employment of water-binding agents, for example by the slow distilling off of excess aldehyde or, if the boiling point of the latter is too high, by the addition of a water-immiscible solvent and slow distillation thereof from the reaction mixture. The reaction proceeds at room temperature (about 20–30° C.) or at raised temperature and is complete in a few hours.

In order to isolate the condensation product, the reaction mixture is advantageously first freed as far as possible of unconsumed aldehyde and, if present, of solvent, by concentration under reduced pressure. The residue from such concentration is then taken up in a suitable binary non-homogeneous solvent system, such for example as chloroform-water or ethyl acetate-water. The water binding agent can then be completely removed by repeated washing of the organic layer with water. On evaporation, the organic layer leaves behind the condensation product which may be contaminated with a small quantity of the aldehyde employed, if the latter is non-volatile and water-insoluble. The last traces of the aldehyde can, however, readily be removed, for example by washing with a suitable solvent such as petroleum ether, hexane, benzene or for example also by treatment with an aqueous alkali metal bisulfite solution. The condensation product is obtained in pure and unitary state by reprecipitation or by recrystallization.

The starting materials for the present invention, insofar as the podophyllum-glucosides from natural sources are concerned, i.e. compounds of Formula II wherein $R_1$ is H or $CH_3$, can be prepared after the manner disclosed in Belgian Patent No. 537,761 of April 28, 1955. Starting materials of Formula II wherein $R_1$ is a higher alkyl group (2 to 6 carbon atoms) can be prepared from α-peltatin-glucoside or from 4'-demethyl-podophyllotoxin-glucoside, i.e. from compounds of Formula II wherein $R_1$ is H, by alkylation with a diazoalkane in neutral ethereal solution at 0° C.

To prepare 4'-demethyl-podophyllotoxin-glucoside, dried podophyllum rhizomes are finely ground and then extracted several times at room temperature with chloroform. The thus-prepurified plant material is then extracted with methanol, after which the obtained yellow-colored extract is concentrated to about ⅓ its volume and then admixed with an equal volume of water. To the aqueous-methanolic solution, there is then added a concentrated aqueous solution of lead acetate as long as precipitation takes place. After the resultant precipitate is filtered off, the solution is freed as far as possible of methanol by concentration under reduced pressure and is then shaken out several times with pure chloroform. The 4'-demethyl-podophyllotoxin-glucoside is then recovered from the aqueous phase by extraction wtih butanol.

The product obtained from the butanol fraction by evaporation contains the demethyl compound in highly concentrated form. It can be purified according to known methods, e.g. by chromatography or by distribution between water-miscible and water-immiscible solvents. A column arrangement with silica gel as the carried material is particularly suitable. Upon eluting the column with ethyl acetate, the initially obtained fractions generally still contain some podophyllotoxin glucoside; later fractions, which are distinguished by a red-brown iron-(III)-chloride reaction, contain the 4'-demethyl-podophyllotoxin glucoside. It can be isolated from these fractions by evaporation and, after re-precipitation from acetone-ether, is obtained in the form of a white powder which melts at 167–170° C., $[\alpha]_D^{20}=75°$ in water.

To obtain α-peltatin glucoside, dried rhizomes of *Podophyllum peltatum* L. are finely ground and then repeatedly extracted with chloroform at room temperature. The thus-prepurified plant material is then extracted with methanol, after which the obtained yellow-colored extract is concentrated to about ⅓ its volume and then admixed with an equal volume of water. To the aqeous-methanolic solution, there is then added a concentrated aqueous solution of lead acetate as long as precipitation takes place. After the resultant precipitate is filtered off, the solution is freed as far as possible of methanol by concentration under reduced pressure and is then shaken out several times, first with chloroform and then with a mixture of chloroform-ethanol (9:1), whereby resinous impurities and the major part of the two glucosides—podophyllotoxin-glucoside and β-peltatin-glucoside—are removed. Thereupon the α-peltatin-glucoside is removed from the aqueous solution by extraction with chloroform containing 30% ethanol.

The chloroform-ethanol extract is evaporated and the residue is chromatographically purified by means of a silica gel column. With water-saturated ethyl acetate, the first fractions eluted from the column give no iron-(III)-chloride reaction, and in addition to podophyllin glucoside, also contain β-peltatin-glucoside. As soon as fractions leave the column which give a positive reaction with iron-(III)-chloride, the residues from the evaporation of such fractions contain α-peltatin-glucoside. These residues are triturated with acetone, whereupon the residues of those fractions in which the glucoside is sufficiently concentrated, soon crystallize. The crystals are separated and recrystallized from acetone, whereupon α-peltatin glucoside is obtained in pure form, having a melting point of 168–171° C. and a rotational value of $[\alpha]_D^{20}=-128.9°$ in methanol.

The new products of the invention are distinguished by strong anti-mitotic action and concomitant low toxicity and, consequently, good tolerability. Thus, for example, when tested on ascites tumors in the mouse, complete inhibition of growth is achieved in very high dilution. The new compounds are suitable for use therapeutically in retarding the growth of malignant tumors and thereby alleviating pain associated therewith. They are thus useful e.g. in the alleviation of pain due to sarcomas, carcinomas, etc. The compounds can be applied externally in the treatment of skin tumors, such e.g. as *Condyloma acuminatum*, such application being advantageously effected in the form of a 5% salve in an ointment base, such as Vaseline. They are also administrable perorally due to their resistance to decomposition in the gastro-intestinal tract; in this way, the course of e.g. leukemia can be slowed down and concomitant discomfort correspondingly alleviated. The compounds are also useful in the preparation of partially acylated glucosides.

The following examples set forth representative illustrative embodiments of the invention. In such examples, the parts are by weight unless otherwise indicated; the relationship between parts by weight and parts by volume is the same as that between grams and milliliters. Temperatures are in degrees centigrade.

*Example 1*

A mixture of thoroughly dried podophyllotoxin glucoside, 3 parts of freshly distilled benzaldehyde and 2 parts of pulverized freshly molten zinc chloride is shaken for 20 hours, with exclusion of moisture, at room temperature. Excess benzaldehyde is then distilled off under reduced pressure and the residue is taken up in chloroform and water. The chloroform layer is washed with water until it has a neutral reaction, and is then dried over sodium sulfate and evaporated. The somewhat oily residue from the evaporation is washed with petroleum ether in order to remove any remaining benzaldehyde, the condensation product being then obtained in pulverulent form. The so-obtained crude product can be purified by recrystallization from absolute ethanol. The thus-purified product—podophyllotoxin - benzylidene - glucoside—is obtained in good yield; melting point=165–170°; $[\alpha]_D^{20}=-81.6°$.

*Example 2*

A mixture of 1 part of 4'-demethyl-podophyllotoxin-glucoside (dried under highly reduced pressure), 3 parts of freshly distilled benzaldehyde and 2 parts of freshly molten pulverized zinc chloride is shaken for 24 hours at room temperature. A dark-colored mass is formed which is triturated and washed a number of times with petroleum ether. The undissolved residue is then distributed between water and ethyl acetate in a Craig distribution apparatus (30 transfers), the reaction product becoming concentrated in the last fractions 26–29. This product is obtained, after reprecipitation, with ether-petroleum ether (1:4), from its solution in acetone, as the pure unitary 4'-demethyl-podophyllotoxin-benzylidene-glucoside which melts at 182–185° and has the optical rotation $[\alpha]_D^{20}=-77.4°$ (in chloroform, c.=1).

If a large quantity of 4'-demethyl-podophyllotoxin-glucoside, for example 50 grams, is used and the reaction product is chromatographicaly purified on dry silica gel, then the peak fractions can be caused to crystallize. The 4' - demethyl - podophyllotoxin - benzylidene -glucoside is thus obtained from methanol in the form of massive prisms with a double melting point 180° and 292–295°. $[\alpha]_D^{20}=-80.0°\pm0.5°$ (c.=0.2 in chloroform); $[\alpha]_D^{20}=-133.4°$ (c.=0.7 in pyridine).

*Example 3*

A mixture of 1 part of thoroughly dried podophyllotoxin-glucoside, 3 parts of anhydrous anisaldehyde (p-methoxy-benzaldehyde) and 2 parts of freshly molten and pulverized zinc chloride is shaken at room temperature for 24 hours with exclusion of moisture. After distilling off excess anisaldehyde under reduced pressure, the viscous yellow residue is distributed between chloroform and water, and then the chloroform phase is shaken out several times with fresh water until a neutral reaction is achieved. The chloroform solution is dried over sodium sulfate and is then evaporated. The somewhat resinous residue from the evaporation is dissolved in about the five-fold quantity of acetone, and the formed anisylidene derivative is precipitated by the addition of about the 75-fold quantity of a mixture of ether and petroleum ether (1:4). The condensation product separates as a white powder which, for further purification, can be chromatographed on alkali-free aluminum oxide. The pure anisylidene compound is eluted from the adsorption column with benzene-chloroform (1:1) and chloroform. The so-obtained compound—podophyllotoxin-p-methoxy-benzylidene-glucoside—is a white amorphous powder which melts at 165–168°; $[\alpha]_D^{20} = -72.8°$ (in chloroform, c.=1).

Example 4

A mixture of podophyllotoxin-glucoside (1 part), p-toluylaldehyde (3 parts) and anhydrous zinc chloride (2 parts) is shaken as in Example 1, excess aldehyde is removed by digesting the reaction solution with petroleum ether, and the undissolved residue is taken up in chloroform and water. The chloroform layer is washed with water until it has a neutral reaction and then, after being dried over sodium sulfate, it is evaporated. The oily residue from the evaporation is washed with petroleum ether to remove remaining traces of unchanged aldehyde, the condensation product remaining behind as a white solid. For further purification, it is chromatographed on alkali-free aluminum oxide, and is eluted from the column with chloroform which contains 1% of methanol. The product—podophyllotoxin-p-methyl-benzylidine-glucoside—is a white amorphous powder which melts at 167–170°; $[\alpha]_D^{20} = 75°$ (in chloroform).

Example 5

1 part of podophyllotoxin-glucoside, which has been thoroughly dried under reduced pressure, is dissolved in an excess of pure anhydrous furfural, and 0.05 part of nitric acid (d.=1.2) is added to the solution. The reaction mixture is heated to boiling; a Soxhlet apparatus charged with a drying agent such as calcium sulfate being interposed between the receptacle containing the reaction mixture being boiled and a reflux condenser. In order that the boiling temperature may not be too high, the entire apparatus is under a pressure of 30–40 mm. Hg. A dry stream of carbon dioxide is sucked into the heated receptacle through an appropriate conduit, e.g. a capillary. Under these conditions, uniform boiling takes place at a bath temperature of 100–110°. After 5 hours, excess furfural is evaporated off under reduced pressure, and the sirupy brown residue is taken up in about the 50-fold quantity of ethyl acetate. The ethyl acetate solution is treated with animal charcoal, and is then evaporated. After the residue from the evaporation is dissolved in the 10-fold quantity of hot absolute alcohol, the furfurylidene compound separates out first in the form of small oil droplets, which soon solidify to yellow crystalline aggregates. After recrystallization from ethanol, the product—podophyllotoxin-furfurylidene-glucoside—is obtained as fine colorless prisms which melt at 174–176°; $[\alpha]_D^{20} = -83.9°$ (in chloroform, c.=0.5).

Example 6

2.5 parts of freshly molten and pulverized zinc chloride are added to the clear solution of 1 part of podophyllotoxin-glucoside in 3 parts of freshly distilled thiophene-2-aldehyde, and this reaction mixture is then shaken at room temperature for 15 hours. Excess aldehyde is then distilled off under reduced pressure, and the sirupy residue from the evaporation is taken up in chloroform. The chloroform solution is then washed with water, dried over sodium sulfate, and the solvent evaporated off. The sirupy residue is washed with petroleum ether in order to remove last traces of thiophene-aldehyde, until the residue becomes flocky and pulverulent. The crude product can now be crystallized from hot absolute ethanol or, if necessary, first subjected to chromatographic purification on aluminum oxide. The so-obtained podophyllotoxin-thenylidene-glucoside corresponds to the formula $C_{33}H_{34}O_{13}S$ and melts at 171–173°; $[\alpha]_D^{20} = -82.7°$ (in chloroform).

Example 7

A mixture of 1 part of podophyllotoxin-glucoside, which has been dried under reduced pressure, 5 parts of freshly distilled acetaldehyde, and 2 parts of freshly molten and pulverized zinc chloride is shaken for 24 hours at room temperature with exclusion of moisture. Excess acetaldehyde is then evaporated off under reduced pressure, and the viscous residue from the evaporation is distributed between chloroform and water. In order to remove the zinc salt from the chloroform phase, the latter is shaken out several times with water until a neutral reaction is achieved. The chloroform solution, dried with sodium sulfate, leaves behind on evaporation a white froth, which is dissolved in benzene and the obtained benzene solution then subjected to purification by chromatography on alkali-free aluminum oxide. By-products are dissolved out of the column with benzene and benzene-chloroform mixtures; chloroform-methanol (99:1) elutes the desired podophyllotoxin-ethylidene-glucoside in homogeneous state from the column. It is a white powder which decomposes at 160–164° and has an optical rotation $[\alpha]_D^{20} = -87.6°$ (in chloroform, c.=0.7).

Example 8

A mixture of 1 part of β-peltatin-glucoside, dried under reduced pressure, 6 parts of freshly distilled benzaldehyde and 5 parts of freshly molten and finely pulverized zinc chloride is shaken for 24 hours at room temperature with exclusion of moisture. After excess benzaldehyde has been evaporated off under reduced pressure, the viscous residue from the evaporation is distributed between chloroform and water. The chloroform phase is shaken out several times with water, and then dried over sodium sulfate and evaporated. The resultant foamy residue can be purified chromatographically. Its solution in benzene-chloroform (2:1) is filtered through a column of alkali-free aluminum oxide. Chloroform-methanol mixture (99:1) elutes the formed β-peltatin-benzylidene-glucoside from the column in unitary form as a white amorphous powder which melts at 180–183° and has an optical rotation $[\alpha]_D^{20} = -99.1°$ (in chloroform, c.=1).

Example 9

A mixture of 1 part of α-peltatin-glucoside, dried under reduced pressure, 6 parts of freshly distilled benzaldehyde and 2.5 parts of freshly molten zinc chloride is shaken for 24 hours at room temperature. The reaction mixture, which is colored dark red-violet, is triturated and washed several times with petroleum ether. The solution of the undissolved residue in chloroform is shaken out several times with water, then dried with sodium sulfate and evaporated. The residue from the evaporation can be purified in a Craig apparatus by distribution between water and ethyl acetate with addition of a small quantity of methanol and ether. For example, a 4:2:2:3 mixture of water-methanol-ethylacetate-ether may be used. The fractions which form the maximum of the concentration curve are purified and dissolved in acetone. By precipitation from the acetone solution by means of a mixture of ether and petroleum ether (1:4), the pure α-peltatin-benzylidene-glucoside is obtained which melts at 182–186° and has the optical rotation $[\alpha]_D^{20} = -103.2°$ (in chloroform, c.=0.9).

Example 10

20 parts of freshly molten and pulverized zinc chloride are added to a solution of 10 parts of podophyllotoxin-glucoside, which has been thoroughly dried under reduced pressure, in 30 parts by volume of freshly distilled salicylaldehyde, and the mixture is shaken for 23 hours at room temperature with exclusion of moisture. 250 parts by volume of water are then added, and the mixture is extracted four times, each time with 100 parts by volume of chloroform. The combined chloroform extracts are washed with water, dried over sodium sulfate, and evaporated under reduced pressure down to 30 parts by volume. The residue so-obtained is diluted with 30 parts by volume of acetone, and the resultant solution is added dropwise to 1000 parts by volume of petroleum ether, while stirring. The salicylidene compound which precipitates in the form of white flocks is filtered off and dried. From its solution in 50 parts by volume of absolute ethanol, there crystallizes out podophyllotoxin-salicylidene-glucoside which, after recrystallization from the 40-fold quantity of hot absolute ethanol, is obtained in the form of clusters of fine white needles which melt at 175–177°; $[\alpha]_D^{20} = -82.4°$ (c.=0.5 in chloroform).

*Example 11*

2 parts of freshly molten and pulverized zinc chloride are added to a solution of 1 part of 4'-demethyl-podophyllotoxin-glucoside, which had been dried under reduced pressure, in 3 parts by volume of freshly distilled anisaldehyde, and the mixture shaken for 23 hours at room temperature with exclusion of moisture. 25 parts by volume of water are then added, and the mixture extracted five times, each time with 20 parts by volume of chloroform. The combined chloroform extracts are washed with water, dried over sodium sulfate, and evaporated under reduced pressure down to 3 parts by volume. The residue from the evaporation is diluted with 7 parts by volume of acetone, and the resultant solution is then added dropwise into 100 parts by volume of petroleum ether while stirring. The anisylidene compound, which precipitates as white flocks, is filtered off and dried. For further purification, the crude precipitate is chromatographed on dry silica gel. The peak fractions eluted with ethyl acetate+0.5% methanol yield, upon reprecipitation from acetone by means of petroleum ether, white amorphous 4'-demethyl-podophyllotoxin-anisylidene-glucoside having a decomposition point at 174–176°; $[\alpha]_D^{20} = -134.3°$ (c.=0.65 in pyridine).

*Example 12*

2 parts of freshly molten and pulverized zinc chloride are added to a solution of 1 part of 4'-demethyl-podophyllotoxin-glucoside which had been dried for 16 hours under reduced pressure at a temperature of 95°, in 3 parts by volume of freshly distilled α-thenylaldehyde, and the mixture is shaken for 20 hours at room temperature with exclusion of moisture. 50 parts by volume of water are then added, and the mixture extracted five times, each time with 25 parts by volume of chloroform. The combined chloroform extracts are washed with water, dried over sodium sulfate, and evaporated under reduced pressure down to 3 parts by volume. The residue from the evaporation is diluted with 3 parts by volume of acetone, and the resultant solution is added dropwise to 100 parts by volume of petroleum ether with stirring. The α-thenylidene compound, which precipitates as white flocks, is filtered off and dried. For further purification, the crude precipitate is chromatographed on dry silica gel. The peak fractions eluted with ethyl acetate+0.5% of methanol can be recrystallized from absolute ethanol whereupon there is obtained 4'-demethyl-podophyllotoxin-α-thenylidene-glucoside having a melting point of 274–277°; $[\alpha]_D^{20} = -145.3°$ (c.=0.5 in pyridine).

*Example 13*

By following the procedure set forth in the preceding example, but replacing the 4'-demethyl-podophyllotoxin-glucoside by 4'-demethyl-4'-ethyl-podophyllotoxin-glucoside, and replacing the α-thenylaldehyde by benzaldehyde, there is obtained 4'-demethyl-4'-ethyl-podophyllotoxin-benzylidene-glucoside; melting point 165–167°, $$[\alpha]_D^{20} = -77.5°.$$

In order to prepare the 4'-demethyl-4'-ethyl-podophyllotoxin-glucoside, an excess of freshly prepared ethereal diazoethane solution is distilled into a solution of 1 part of 4'-demethyl-podophyllotoxin-glucoside in 25 parts by volume of methanol. After standing for three hours at 0°, the solution is evaporated under reduced pressure, and the 4'-demethyl-4'-ethyl-podophyllotoxin-glucoside is precipitated from the solution of the residue in acetone by means of ether-petroleum ether. The compound has a melting point of 144–147°; $[\alpha]_D^{20} = -61°$ (methanol).

Having thus disclosed the invention, what is claimed is:
1. A compound corresponding to the formula

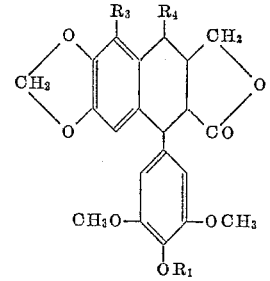

wherein $R_1$ stands for a member selected from the group consisting of H and alkyl with 1 to 6 carbon atoms, one of $R_3$ and $R_4$ being H and the other being the

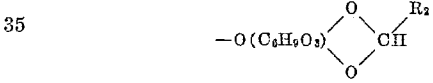

grouping, and $R_2$ stands for a member selected from the group consisting of the $-CH_3$, $-C_2H_5$, $-C_6H_5$, $-C_6H_4OH$, $-C_6H_4OCH_3$, $-C_6H_4CH_3$,

and

radicals.

2. Podophyllotoxin-benzylidene-glucoside.
3. 4' - demethyl - podophyllotoxin - benzylidene - glucoside.
4. Podophyllotoxin-α-thenylidene-glucoside.
5. 4'-demethyl-podophyllotoxin-anisylidene-glucoside.
6. 4' - demethyl - podophyllotoxin - α - thenylidene-glucoside.

References Cited in the file of this patent

Nadkarni et al.: 75 J.A.C.S., 1308–3112, May 20, 1953.
Stoll et al.: 76 J.A.C.S., 3103–3104, June 5, 1954.
Stoll et al.: 76 J.A.C.S., 6413–6414, December 20, 1954.